(No Model.)

H. H. DILLE & E. W. McGUIRE.
PAWL AND RATCHET MECHANISM.

No. 426,368. Patented Apr. 22, 1890.

UNITED STATES PATENT OFFICE.

HENRY H. DILLE AND ELWOOD W. McGUIRE, OF RICHMOND, INDIANA, ASSIGNORS TO THE DILLE & McGUIRE MANUFACTURING COMPANY, OF SAME PLACE.

PAWL-AND-RATCHET MECHANISM.

SPECIFICATION forming part of Letters Patent No. 426,368, dated April 22, 1890.

Application filed February 20, 1888. Renewed February 3, 1890. Serial No. 338,978. (No model.)

*To all whom it may concern:*

Be it known that we, HENRY H. DILLE and ELWOOD W. McGUIRE, of Richmond, in the county of Wayne, and in the State of Indiana, have invented certain new and useful Improvements in Pawl-and-Ratchet Mechanisms; and we do hereby declare that the following is a full, clear, and exact description thereof, reference being had to the accompanying drawings, in which—

Figure 1:
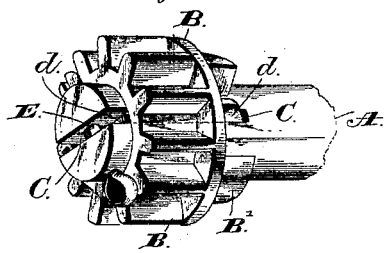
Figure 2:
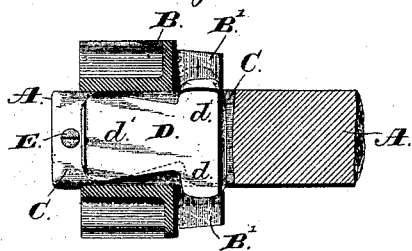
Figure 3:
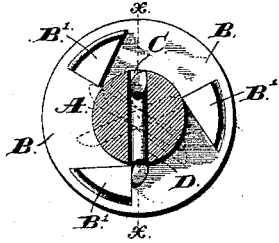

Figure 1 shows a perspective view of a pinion and shaft provided with our improved pawl-and-ratchet connection; Fig. 2, a view of a longitudinal section of the same; Fig. 3, a view of a transverse section on line $x\,x$ of Fig. 2, showing the automatic operation of the pawl and ratchet; and Fig. 4, a detail perspective view of a slightly-modified form of the ratchet on the side of the pinion.

Letters of like name and kind refer to like parts in each of the figures.

The object of our invention is to provide an improved pawl-and-ratchet mechanism; and to this end our invention consists in the pawl-and-ratchet mechanism and in the construction, arrangement, and combination of the parts thereof, as hereinafter specified.

We shall show and describe our pawl-and-ratchet device as applied to the connection of a shaft and pinion; but we desire it to be understood that it is, like other pawl-and-ratchet mechanisms, applicable for many other purposes where it is desired to clutch two moving parts or devices together in one direction while leaving them free to have independent movement in the other direction. For instance, the shaft, pawl, and pinion provided with the ratchet-teeth can be used in a train of gearing, as in the gearing used to drive the rotary cutter-shaft in a mower; or the pawl and ratchet can be used in the place of the usual backing-clutches in use in all sorts of harvesters and agricultural machinery for connecting the driving wheel or wheels with a shaft or some portion of the operating-gearing.

In the drawings, A designates a shaft or arbor, and B a pinion or wheel loosely journaled thereon and having an annular series of ratchet-teeth B' B'. These teeth are turned inward toward the shaft, so that their edges formed by the meeting of their inclined and abrupt sides stand close to the shaft periphery. In the shaft is a diametrical slot or mortise C, passing through and extending longitudinally along the shaft to or beyond the outer side of the series of ratchet-teeth B' B' on wheel or pinion B. In this slot fits and plays the pawl D, consisting of the head $d$, which from its shape can be termed a "cross-head," of width greater than the shaft diameter, so that in whatever position the head may be one of its ends must project beyond the shaft-periphery and the shank $d'$ at its outer end of a width substantially equal to the width of the shaft. This end of the pawl-shank then substantially fills the slot C from side to side of the shaft, and being situated in that portion of the shaft upon which the wheel or pinion B is journaled will be kept from swinging out of the slot by the walls of the journal-opening of the pinion, as shown in the drawings. From this wide outer end the pawl-shank tapers inward on both sides to the head $d$. Such tapering of the pawl-shank is to allow the head end of the pawl to swing in either direction, so that either end or side of the head can be projected out of the slot C and beyond the shaft-periphery.

The pawl-head $d$ is situated in the slot just beyond the side of the wheel or pinion B in position to engage the ratchet-teeth B' with either of its ends or sides, which may be projected out of the slot.

The end of slot C will prevent the pawl from moving outward in that direction, so as to be out of position to be engaged by the ratchet-teeth B' B', and as the pawl-head is of greater width than the shaft or the journal-opening in the wheel or pinion the pawl cannot get out of position by moving in the other direction. The wide portion of the shank while being held, as described hereinbefore, from swinging out of the slot C is capable of such movement as to allow the free swinging of the pawl in either direction to bring one side or the other of its head $d$ out of the slot into position to engage or be engaged by the ratchet-teeth.

No pivot-pin for the pawl is needed to provide a fulcrum for its swinging or to keep it in place or operative position.

With the pinion or wheel kept in place on the shaft in any of the usual and well-known ways the pawl will also be maintained in its proper position.

In the drawings, a pin E is shown for holding the pinion on the shaft; but such pin is not needed to engage and hold the pawl in its place.

The ratchet-teeth B' B' are arranged so that each tooth is opposite a space on the other side of the annular series of teeth. With this construction, if the shaft be turned independently of the wheel, or the wheel be rotated around the shaft in one direction, the inclined side of a ratchet-tooth engaging a projecting end of the pawl-head will force such end inward, so as to swing the pawl and make the opposite end of the head protrude from the slot in position to be engaged and moved back again by a tooth on that side subsequently engaging the protruding head end. Thus as the wheel or shaft is turned to cause the inclined faces of the ratchet-teeth to engage alternately the pawl-head ends the pawl will be positively swung one way and the other, leaving the pawl or shaft free to rotate, and either one end or the other of the pawl-head will always be in position to engage solidly the abrupt side of a ratchet-tooth if the wheel or shaft be turned the other way. As shown in the drawings, the sides of the pawl-head ends which would engage the inclined sides of the ratchet-teeth are beveled; but we do not limit ourselves to such construction, as the pawl will act well if the head ends be not so beveled.

Figure 4:
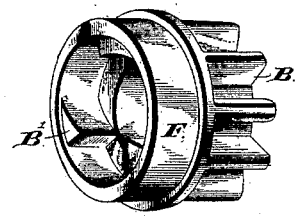

In Fig. 4 we show a slight modification of the ratchet on the side of the pinion. In this form an annular flange F on the pinion is shown extending around and inclosing the series of ratchet-teeth. Such teeth also, instead of having plane or straight inclined faces, have their inclines slightly concaved.

Our pawl-and-ratchet mechanism is, as shown and described by us, a simple, strong, and positively-acting one, not requiring a spring or the action of gravity to operate it. It needs no pivot-pin, which is liable to wear out, get broken, or lost, and cannot get out of place or into an inoperative position.

We contemplate using our pawl-and-ratchet mechanism for connecting the stem-winding arbor of a watch with the crown. In such case the arbor would be the shaft shown in the drawings and the crown would take the place of the pinion shown. The crown would then be a rotary piece surrounding the arbor or shaft, and could be provided with a part to engage and keep the pawl-shank in place, and also with the ratchet-teeth to engage the ends of the cross-head of the pawl.

Having thus described our invention, what we claim is—

1. In a pawl-and-ratchet mechanism, in combination with a slotted shaft or arbor, the pawl in the slot having the head of greater width than the diameter of the shaft or arbor and the shank with the enlarged portion of such diameter as to substantially fill the slot, and means for closing the slot at its sides, so as to keep the enlarged part of the pawl-shank in place in the slot, substantially as and for the purpose specified.

2. In a pawl-and-ratchet mechanism, in combination with the slotted shaft or arbor and the turning piece surrounding the shaft and provided with the ratchet-teeth, the swinging pawl in the slot in the shaft or arbor having the head of greater width than the shaft and the shank increased in width toward its end, so as to substantially fill the slot at such end, substantially as and for the purpose set forth.

3. In combination with the shaft or arbor provided with the slot, the wheel journaled on the slotted portion of the shaft and having the series of ratchet-teeth and the pawl having the head of a width greater than the diameter of the shaft, and the shank provided with an enlarged portion to engage the sides of the journal-opening in the wheel as the pawl swings in the slot, substantially as and for the purpose described.

4. In combination with the shaft or arbor provided with a slot and the wheel journaled thereon and provided with the series of ratchet-teeth, the pawl having the ratchet-engaging head of greater width than the shaft and the shank having the enlarged end to be kept in place in the slot as the pawl swings by the sides of the journal-opening in the wheel, substantially as and for the purpose specified.

5. In combination with the slotted shaft or arbor and the wheel thereon, provided with the series of ratchet-teeth on its side, having their inclined faces turned inward toward the shaft, the pawl having the ratchet-engaging head wider than the shaft, and the shank with the enlarged portion situated in the part of the slot in the shaft inclosed by the journal part of the wheel, substantially as and for the purpose shown.

6. In a pawl-and-ratchet mechanism, in combination with the slotted arbor and the ratchet on a sleeve or barrel journaled on the shaft, the pawl in the slot having the cross-head, and the shank enlarged at its end to fill the slot in the arbor and from such end tapering down to the head, substantially as and for the purpose set forth.

7. In a pawl-and-ratchet mechanism, in combination with a slotted arbor and a sleeve or barrel thereon, having the ratchet-teeth at one end facing in toward the shaft, the pawl in the slot in the arbor, having the cross-head whose ends are adapted to engage the ratchet-teeth, and the shank having the enlarged portion adapted to be kept in place while the pawl swings by the inclosing sleeve or barrel on the arbor, substantially as and for the purpose described.

8. In a pawl-and-ratchet mechanism, in combination with the slotted ratchet-arbor, the T-shaped pawl in the slot in the arbor, having the outer end of its shank made to substantially fill the slot in the arbor and rounded at its sides, means for engaging the sides of the outer end of the shank, so as to keep it in the slot, and a rotary piece having ratchet-teeth adapted to engage the ends of the cross-head of the pawl, substantially as and for the purpose specified.

In testimony that we claim the foregoing we have hereunto set our hand this 25th day of January, 1888.

HENRY H. DILLE.
ELWOOD W. McGUIRE.

Witnesses:
LIZZIE JONES,
SARAH E. MENDENHALL.